United States Patent [19]

Jonsson et al.

[11] Patent Number: 4,813,860
[45] Date of Patent: Mar. 21, 1989

[54] EQUIPMENT FOR PORTIONING OUT PIECES OF A DOUGHY PRODUCT

[75] Inventors: Olov T. Jonsson, Kumla; Sune R. Carlsson, Arboga, both of Sweden

[73] Assignee: Albin Pump Aktiebolag, Örebro, Sweden

[21] Appl. No.: 146,248

[22] Filed: Jan. 20, 1988

[30] Foreign Application Priority Data

Apr. 28, 1987 [SE] Sweden ................. 8701736

[51] Int. Cl.⁴ .................... A21C 5/00; A21C 11/16
[52] U.S. Cl. ......................... 425/142; 425/202;
   425/204; 425/205; 425/308; 425/311; 425/377
[58] Field of Search ............... 425/202, 204, 205, 308,
   425/140, 310, 142, 311, 238, 376 R, 376.1, 377

[56] References Cited

U.S. PATENT DOCUMENTS

| 659,229 | 10/1900 | Hoff et al. | 425/206 |
|---|---|---|---|
| 3,059,584 | 10/1962 | Cottrell | 418/206 |
| 3,249,068 | 5/1966 | Gembicki | 425/308 |
| 3,782,876 | 1/1974 | Grof | 425/311 |
| 3,831,906 | 8/1974 | Wakeman | 418/206 |
| 4,201,529 | 1/1980 | Atwood | 425/238 |
| 4,269,582 | 5/1981 | Mella | 425/205 |
| 4,332,538 | 6/1982 | Campbell | 425/140 |

FOREIGN PATENT DOCUMENTS

| 0140617 | 8/1985 | European Pat. Off. . | |
|---|---|---|---|
| 74747 | 12/1958 | France | 425/238 |
| 2126969 | 10/1972 | France . | |
| 2477378 | 9/1981 | France | 425/140 |
| 0231483 | 12/1984 | German Democratic Rep. | 425/238 |

Primary Examiner—Willard Hoag
Attorney, Agent, or Firm—Armstrong, Nikaido, Marmelstein & Kubovcik

[57] ABSTRACT

An equipment for portioning out pieces of a doughy product, which pieces have a weight, which, to a great accuracy, is equivalent to a certain desired, predetermined weight. The equipment includes a pump having a feeding device and a discharge duct as well as means in a feeding unit to feed said doughy product through said feeding duct into said pump. The equipment also includes means to cut off said pieces of the product, which is discharged by the pump through said discharge duct. The pump is a lobe rotor pump. The doughy product is fed to the lobe rotor pump by a device, which provides a flow, which is somewhat larger than the discharge flow of the pump, a certain amount of the product being recirculated in said feeding unit.

14 Claims, 4 Drawing Sheets

EQUIPMENT FOR PORTIONING OUT PIECES OF A DOUGHY PRODUCT

TECHNICAL FIELD

The present invention relates to an equipment for portioning out pieces of a doughy product. The invention relates particularly to an equipment for portioning out pieces, which have a weight, which with great accuracy corresponds to a certain desired predetermined weight. The equipment comprises a pump having a feeding duct and a discharge duct as well as means in a feeding unit designed to feed the doughy product through the feeding duct into the pump. Additionally, the equipment comprises means to cut off said pieces of the product, which is discharged by the pump through said discharge duct.

BACKGROUND ART

In conjunction with a plurality of technical applications there is a need of an accurate dosage of pieces or parts of a plastic material. Such accurately dosed pieces of a plastic material is of importance in widely differing fields, e.g. in the plastics and the foodstuff processing technologies.

A fundamental difficulty in conjection with an accurate weight dosage of a plastically extruded material having a constant cross-section resides in the fact, that air inclusion in the plastic compound results in variations in the weight of the compound per unit of length. Another difficulty resides in the fact that many doughy compounds, e.g. doughs for pastry-work, to some degree are compressible. Consequently, variations as to feed pressure cause variations in the weight per unit of length of the extruded product.

Thus, a dosage, which is based on measuring the extruded length or volume, requires a feeding to the dosage device under a constant pressure and without risk of air inclusion formation in the extruded compound.

In the patent literature, there is a multitude of devices, which are designed for dosage of a plastic material or a doughy material and which are based on a volumetric portioning out of the flow of the compound. Examples of such devices are those described in the U.S. Pat. Nos. 4,332,538, 2,791,975 and 2,787,832. Said devices, which are based on a volumetric dosage, have a drawback, because pressure variations in conjunction with the feeding may result in dosage errors in case the plastic or doughy compound is compressible. Also, air inclusions results in dosage errors, which may be an important source of errors.

In the printed international publication WO 84/02633 and in U.S. Pat. No. 3,489,104 and the German patent specification No. 449,926 devices designed for volumetric dosage are described, which are provided with a roller feed. By means of the roller feed a comparatively constant pressure is attained in conjunction with the feeding to those parts of the devices, which perform the volume dosage. However, said devices are designed in such a way, that only a portion of each of the feed rollers is in contact with the plastic compound or the doughy compound in conjunction with the feeding of the compound between the rollers. This leads to the drawback, that seals are required, which engage the rollers and delimit that portion of the rollers being in contact with the compound. The necessary seals require a very accurate adjustment to complete eliminate a leakage of the plastic material and an air penetration. Also, the seal components are wear parts, which require regular servicing and regular replacements, which result in expenses.

BRIEF DESCRIPTION OF THE INVENTION

The purpose of the present invention is to suggest a device, by means of which the drawbacks and limitations mentioned above are eliminated. Said device is characterized in that the pump is a lobe rotor pump and in that said means for feeding the doughy product through the feeding unit into the pump is designed to feed products having a flow, which is somewhat larger than the discharge flow from the pump, the result being that a certain amount of the product is recirculated in the feeding unit. Additional characterizing features and advantages of the invention are apparent from the following description of a preferred embodiment and the enclosed patent claims.

BRIEF DESCRIPTION OF THE DRAWINGS

In the following description of a preferred embodiment reference is made to the accompanying drawings.

DESCRIPTION OF A PREFERRED EMBODIMENT

Figure 1:
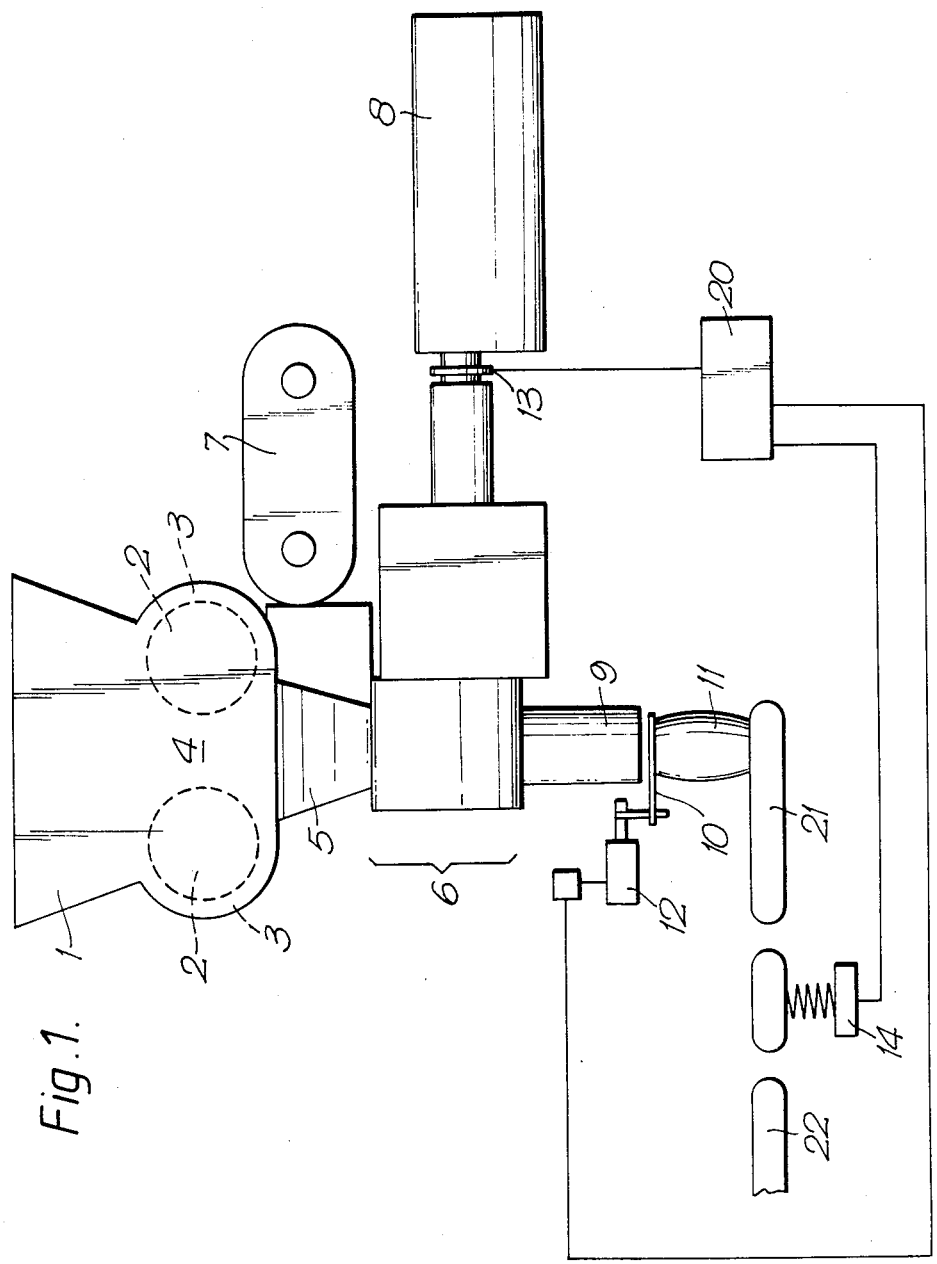
FIG. 1 is a schematic view of the equipment and the associated control components.

A feeding hopper for e.g. a doughy compound is designated with reference numeral 1. Feeding hopper 1 is a part of a feeding unit 19, which is designed to continuously and under constant pressure provide a lobe rotor pump 6 with e.g. a doughy compound or a plastic compound. The feeding unit includes feeding hopper 1, two feed rollers 2, a housing 18 for the feeding roller as well as a transfer duct 5, which connect rollers 2 and lobe rotor pump 6, and a feeding duct to lobe rotor 6.

Rollers 2 are driven by an electric motor, the speed of which can be adjusted to a suitable value by a variator 7. The rollers are grooved and one of them is driven in clockwise direction, while the other one is driven counter-clockwise. The rotational speed of the two rollers is the same. The doughy or plastic compound, which is to be fed into the lobe rotor pump, is pulled downwards by rollers 2 through a comparatively wide gap 4 between the rollers. The rotational direction of the rollers is adjusted in such a way, that the periphery of the rollers is given a vertical speed component in connection with feeding gap 4. Thanks to the comparatively large width of gap 4 it is possible to substantially avoid a compressing of the compond, which would be disastrous, e.g. if the compound was a risen bakery dough.

Figure 2:
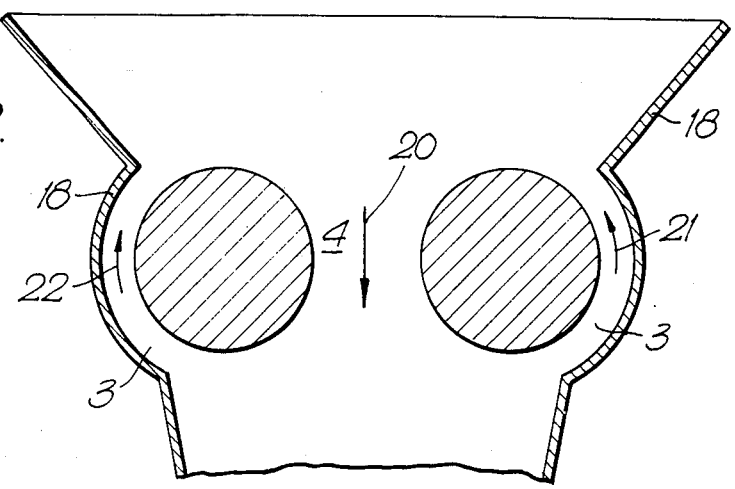
FIG. 2 is a vertical section of the feeding unit.
Figure 4:
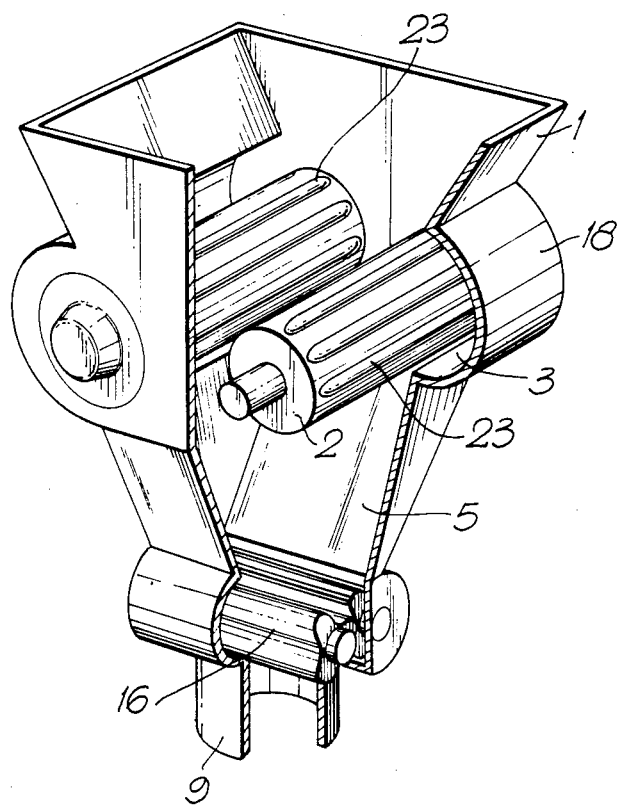
FIG. 4 is a perspective view of the feeding unit and the lobe rotor pump.
Figure 5:
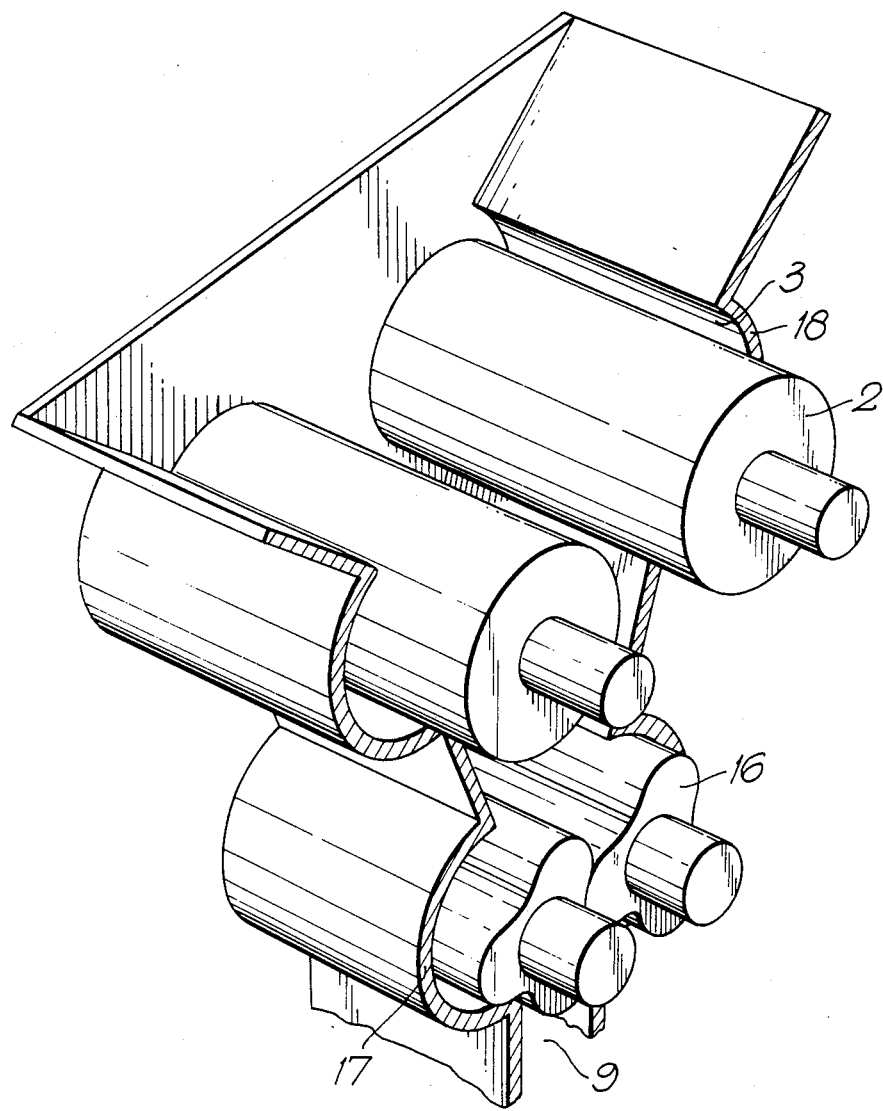
FIG. 5 is a perspective view of the feeding unit and the lobe rotor pump in an embodiment, in which the shafts of the rollers and the shafts of the lobe rotors are mounted in parallel.

Rollers 2 are mounted in and surrounded by housing 18. FIGS. 2, 4 and 5 show a return duct 3 between each one of rollers 2 and housing 18. Said return ducts 3 allow recirculation of the dough or the plastic compound. In FIG. 2 the direction of motion of the dough or the compound in gap 4 between rollers 2 is indicated by arrow 20. The direction of motion of the recirculated compound in return ducts 3 is indicated by arrows 21, 22. Thus, when the device is in operation, rollers 2 are completely surrounded by the dough or the plastic compound, which is being fed to lobe rotor pump 6.

The ratio between the rotational speed of rollers 2 and the output capacity of lobe rotor pump 6 is adjusted to the type of compound, which is being fed to lobe rotor pump 6. Said ratio is determined experimentally. When determining the rotational speed of rollers 2, provision has to be made for the continuous recirculation of an amount of the compound through return ducts 3 between housing 18 and rollers 2. The feeding of the compound in this way results in an elimination of possible air inclusions. In the space between hopper 1 and lobe rotor pump 6 there are no movable seals, which the compound must pass, except that shaft packings of rollers 2. The exclusion of such seals, e.g. seals between the periphery of the roller and the feeding hopper, also results in a sharply reduced risk of air inclusions. In this way it is also feasible to provide rollers 2 with grooves 23.

Grooves 23 are wave-shaped in a preferred embodiment. The wave length and the amplitude of grooves 23 are determined experimentally and are adjusted to various types of e.g. doughy or plastic compounds. The distance between rollers 2 may be fixed, but it may be convenient to make it adjustable in order to adapt it to e.g. different tpyes of compounds and different operational speeds.

Transfer duct 5 has the shape of a truncated regular pyramid having a rectangular basis. The pyramid is truncated along a plane, in parallel with said basis. Transfer duct 5 is a feeding duct to lobe rotor pump 6, which comprises a housing 17 and two lobe rotors 16. One of the lobe rotors is driven clockwise, the other one counter-clockwise. Lobe rotors 16 are rotated with such a rotational direction, that those portions of the lobe rotors, which have the largest mutual distance, have a speed component directed from transfer duct 5 to a discharge duct 9. The construction principle of the lobe rotor pump has the effect that the pump for a certin rotational speed feeds a certain volume of a compound, which is proportional to the rotational speed.

Lobe rotor pump 6 is driven by a motor and variator unit 8. By means of unit 8 the lobe rotors can be run at various rotational speeds in order to provide lobe rotor pump 6 with alternate feeding speeds.

On the input shaft of lobe rotor pump 6 there is an impulse generator 13, which delivers pulses having a frequency, which is proportional to the rotational speed of lobe rotor pump 6. Consequently, the impulse frequency is also proportional to the feeding speed of the lobe rotor pump.

The compound is transferred from the lobe rotor pump to a discharge duct 9. Discharge duct 9 is designed as a short cylinder tube having a vertical axis. In the lower end of discharge duct 9 a knife 10 is provided, which is designed to cut off the string of the dough or plastic compound, which is pressed out of discharge duct 9. The knife is controlled by a pneumatic cylinder 12, which strikes after a number of pulses, which are set in a program. The program can be controlled by a micro computer 20.

A balance 14 is shown in FIG. 1 as well as a conveyor belt 21 and 22 and an amount 11 of the compound, which is cut off by knife 10 to the desired weight and volume. After the cutting off of amount 11 of the compound said amount is transferred to conveyor belt 21 and subsequently transferred to a balance 14. In case it is found that the weight of amount 11 of the compound does not correspond to the desired weight, compound 11 is influenced by a swivel arm, which pushses dough compound 11 off conveyor belt 22. Amount 11 of the compound, which has been discarded in this way, may be brought back to feeding hopper 1.

Balance 14 may also be connected to micro computer 20, which by means of unit 8 can adjust the feeding speed of lobe rotor pump 6. In this way it is feasible to dose with a constant weight, also in case the fed compound fluctuates as regards density.

Figure 3:
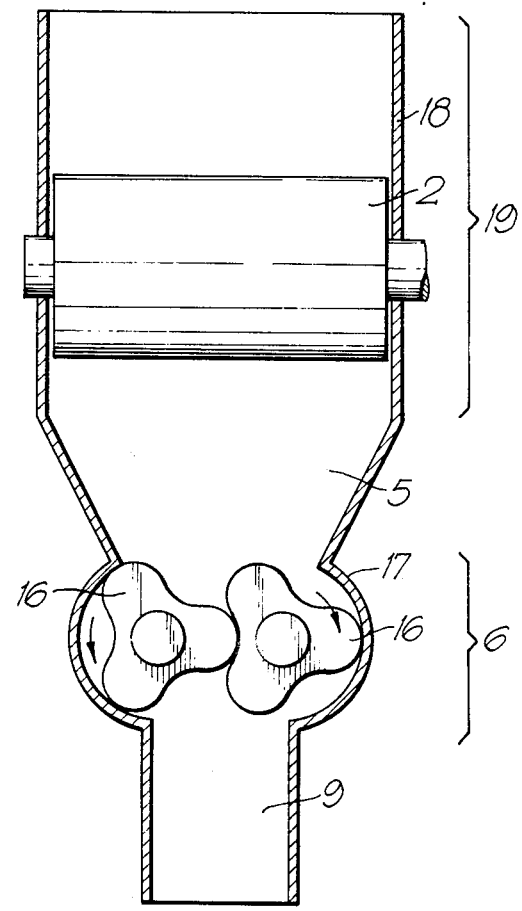
FIG. 3 is a vertical section of the feeding unit, the lobe rotor pump and the discharge duct.

In FIGS. 3 and 4 an embodiment is shown, in which the shafts of rollers 2 are perpendicular to the shafts of lobe rotors 16. In FIG. 15 an embodiment is shown, in which lobe rotors 16 are mounted in parallel with the shafts of the rollers.

Additional modifications of the system are possible without departing from the inventive principle and idea, as it is defined in the succeeding patent claims.

We claim:

1. An equipment for portioning out pieces of a doughy product, which pieces have a weight, which, to a great accuracy, corresponds to a certain desired predetermined weight, comprising:
   a lobe rotor pump having a feeding duct and a discharge duct,
   means in a feeding unit for feeding the doughy product through the feeding duct into the pump, and
   means for cutting off said pieces of the product discharged by the pump through the discharge duct;
   said means in the feeding unit for feeding the product through said feeding duct into the lobe rotor pump including
   a housing connected to said feeding duct,
   two rollers rotatably mounted in said housing in parallel and at a considerable distance from each other so that a wide first gap is formed between the rollers, at least one of said rollers being positioned to define a second gap between said at least one of said rollers and said housing which surrounds said rollers, and
   means for driving said rollers in directions opposite to each other in said first gap in the intended feeding direction,
   said second gap defining a return duct for the doughy product, so that the product can be propelled through said first gap with a flow which is somewhat larger than a discharge flow of said lobe rotor pump, such that a certain amount of the product is recirculated through said return duct from a space after the rollers to a space before the rollers as viewed in the direction of flow of the product through said first gap.

2. An equipment according to claim 1, wherein a width of said first gap is equivalent to between 0.5 and 2 times a radius of the feed rollers.

3. An equipment according to claim 1, wherein said means for cutting off pieces of the product comprises a knife, and a pneumatic cylinder connected to and controlling said knife.

4. An equipment according to claim 1, wherein the distance between said rollers can be varied.

5. An equipment according to claim 1, wherein said feeding duct is a tapering duct.

6. An equipment according to claim 1, wherein said feeding duct is shaped as a truncated regular pyramid, which has a rectangular basis and is truncated in a plane parallel with said basis, the cross-sectional surface of the duct decreasing in a direction towards said lobe rotor pump.

7. An equipment according to claim 1, wherein said means for cutting off pieces of said product is activated on the basis of input data and includes a control unit supplying signals forming at least part of said input data, said control unit including means for counting pulses, the frequency of which is proportional to the rotational speed of said lobe rotor pump.

8. An equipment according to claim 7, wherein said input data also includes weight data from a balance, which weight data are processed by said control unit and transformed into control signals, which control at least one of the rotational speed of the lobe rotor pump and the time interval between cuts, which are performed by said cutting off means the result being that a deviation from said product weight is minimized.

9. An equipment according to claim 1, wherein said rollers are provided with grooves.

10. An equipment according to claim 9, wherein said grooves are directed in parallel with the shafts of the rollers.

11. An equipment according to claim 1, wherein a first plane, which is formed by the shafts of said rollers, and a second plane, which is formed by said lobe rotor shafts of said lobe rotor pump, are arranged in parallel.

12. An equipment according to claim 11, wherein said rollers and said shafts of said lobe rotors are symmetrically disposed in relation to a common axis, which is perpendicular to said first and second parallel planes.

13. An equipment according to claim 12, wherein the shafts of said rollers are perpendicular to the shafts of said lobe rotors.

14. An equipment according to claim 12, wherein the shafts of said rollers are disposed in parallel with the shafts of said lobe rotors.

* * * * *